(12) United States Patent
Tombe et al.

(10) Patent No.: US 10,814,488 B2
(45) Date of Patent: Oct. 27, 2020

(54) ASSEMBLY BODY MANUFACTURING DEVICE AND ASSEMBLY BODY MANUFACTURING METHOD

(71) Applicant: MITSUBISHI HEAVY INDUSTRIES, LTD., Tokyo (JP)

(72) Inventors: Toshihiro Tombe, Tokyo (JP); Takuya Goto, Tokyo (JP); Takahiro Inagaki, Tokyo (JP); Makoto Hirai, Tokyo (JP); Naoki Goto, Tokyo (JP); Masanobu Mizukami, Aichi (JP); Katsumi Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 134 days.

(21) Appl. No.: 15/577,792

(22) PCT Filed: Jul. 19, 2016

(86) PCT No.: PCT/JP2016/071193
§ 371 (c)(1),
(2) Date: Nov. 29, 2017

(87) PCT Pub. No.: WO2017/022473
PCT Pub. Date: Feb. 9, 2017

(65) Prior Publication Data
US 2018/0154524 A1 Jun. 7, 2018

(30) Foreign Application Priority Data
Aug. 3, 2015 (JP) ................................ 2015-153294

(51) Int. Cl.
*B25J 9/16* (2006.01)
*B25J 13/00* (2006.01)
(Continued)

(52) U.S. Cl.
CPC ............ *B25J 9/1694* (2013.01); *B21J 15/142* (2013.01); *B23P 19/10* (2013.01); *B25J 9/0093* (2013.01);
(Continued)

(58) Field of Classification Search
CPC . B25J 9/1694; B25J 9/16; B25J 9/0093; B25J 9/1687; B25J 13/00; B25J 13/086;
(Continued)

(56) References Cited

U.S. PATENT DOCUMENTS 4,770,120 A * 9/1988 Komatsu ................. B05C 13/00
118/500
4,821,408 A * 4/1989 Speller, Sr. ........... B23P 21/004
29/281.5

(Continued)

FOREIGN PATENT DOCUMENTS

| DE | 102011116437 A1 | 4/2013 |
| JP | 2001-300823 A | 10/2001 |
| JP | 3947997 B2 | 7/2007 |

OTHER PUBLICATIONS

Extended European Search Report in EP Application No. 16832752.6, dated Mar. 6, 2018. 8pp.
(Continued)

*Primary Examiner* — Orlando E Aviles
*Assistant Examiner* — Robert F Neibaur
(74) *Attorney, Agent, or Firm* — Kanesaka Berner and Partners LLP (57) ABSTRACT

To hold a long member in the original shape of the long member at a precise position, a long member assembling device has: a plurality of hand parts configured to grip a long member; arm parts and trunk parts configured to move the hand parts to adjust the positions of the plurality of hand parts gripping the long member; a storage unit in which the
(Continued)

original shape of the long member is stored; and a control unit configured to, on the basis of the original shape of the long member stored in the storage unit, drive the arm parts and the trunk parts to adjust the positions of the plurality of hand parts gripping the long member such that the shape of the long member gripped by the plurality of hand parts matches the original shape of the long member stored in the storage unit.

11 Claims, 10 Drawing Sheets

(51) Int. Cl.
    *G05B 19/418*     (2006.01)
    *B21J 15/14*     (2006.01)
    *B23P 19/10*     (2006.01)
    *B64C 3/18*     (2006.01)
    *B64F 5/10*     (2017.01)
    *B25J 9/00*     (2006.01)
    *B25J 13/08*     (2006.01)
    *B64C 1/06*     (2006.01)
    *B64C 1/12*     (2006.01)

(52) U.S. Cl.
    CPC ............ *B25J 9/1687* (2013.01); *B25J 13/00* (2013.01); *B25J 13/086* (2013.01); *B64C 1/061* (2013.01); *B64C 1/064* (2013.01); *B64C 1/069* (2013.01); *B64C 3/182* (2013.01); *B64F 5/10* (2017.01); *G05B 19/41805* (2013.01); *B23P 2700/01* (2013.01); *B64C 1/12* (2013.01); *G05B 2219/35189* (2013.01); *G05B 2219/40482* (2013.01); *G05B 2219/50125* (2013.01)

(58) Field of Classification Search
    CPC ..... B23P 19/10; B23P 2700/01; B21J 15/142; B64F 5/10; B64C 1/061; B64C 1/064; B64C 1/069; B64C 1/12; B64C 3/182; G05B 19/41805; G05B 2219/40482; G05B 2219/50125; B05B 2219/35189; B23Q 1/0054; B23Q 1/25–287; B23Q 1/48; B23Q 1/50–525; B23Q 1/54; B23Q 7/04; B23Q 7/046–048; B23Q 7/05; B23Q 7/055; B23Q 2703/12
    USPC ............ 29/281.1, 281.2, 281.3, 281.4, 281.5
    See application file for complete search history.

(56) References Cited

U.S. PATENT DOCUMENTS

| | | | |
|---|---|---|---|
| 4,995,146 A * | 2/1991 | Woods | B25B 5/003 269/45 |
| 5,910,894 A | 6/1999 | Pryor | |
| 6,170,157 B1 | 1/2001 | Munk et al. | |
| 6,408,517 B1 | 6/2002 | Lehmker et al. | |
| 7,168,898 B2 * | 1/2007 | Hamann | B23Q 1/035 269/21 |
| 9,205,558 B1 * | 12/2015 | Zevenbergen | B25J 9/1664 |
| 9,920,657 B2 * | 3/2018 | Kartheuser | F01D 25/285 |
| 10,025,293 B2 * | 7/2018 | Bickerstaff | G05B 19/4099 |
| 2004/0093731 A1 | 5/2004 | Sarh | |
| 2005/0008469 A1 * | 1/2005 | Jung | B65G 47/91 414/729 |
| 2014/0288695 A1 | 9/2014 | Meissner et al. | |
| 2014/0325813 A1 * | 11/2014 | Batt | B23P 13/00 29/428 |
| 2014/0328655 A1 | 11/2014 | Nou et al. | |
| 2016/0257428 A1 | 9/2016 | Batt | |

OTHER PUBLICATIONS

International Search Report in PCT/JP2016/071193, dated Oct. 25, 2016. 4pp.
Written Opinion of the International Searching Authority in PCT/JP2016/071193, dated Oct. 25, 2016. 12pp.

* cited by examiner

ASSEMBLY BODY MANUFACTURING DEVICE AND ASSEMBLY BODY MANUFACTURING METHOD

TECHNICAL FIELD

The present invention relates to an assembly body manufacturing device and an assembly body manufacturing method.

BACKGROUND ART

In a typical manufacturing method, when a long member that has low rigidity and readily bends is mounted with another component, the long member is held by a fixing jig. Such a fixing jig has high rigidity and can thus prevent the long member from bending when the other component is mounted on the long member.

Patent Document 1, indicated below, discloses technology for precisely assembling large products such as large aircraft fuselages.

CITATION LIST

Patent Document

Patent Document 1: U.S. Pat. No. 6,408,517

SUMMARY OF INVENTION

Technical Problems

The long member is, for example, a stringer, which is a structure of an aircraft, and has a length of approximately 5 m to 15 m. Such stringers have different shapes depending on the installation positions, and various types of stringers may be installed in one aircraft. Thus, various types of fixing jigs for holding the stringers need to be prepared in mounting another component, such as clips, on the stringers.

Furthermore, plate-shaped skins joined to the stringers often have double-curved surfaces. When the skins having double-curved surfaces, the stringers have stereoscopic shapes with compound curves. That is, the stringers are not linear members that can be installed along one plane, and the fixing jigs for holding the stringers also have complex shapes.

Note that the aforementioned problems are not limited to the stringers used for aircrafts and typically occur in holding a long member that has low rigidity and readily bends.

In the light of the foregoing, an object of the present invention is to provide an assembly body manufacturing device and an assembly body manufacturing method capable of holding a long member in the original shape of the long member at a precise position without using a fixing jig in holding the long member.

Solution to Problems

An assembly body manufacturing device according to a first aspect of the present invention includes: a plurality of gripping parts configured to grip a first member having a long shape; a drive part configured to move each of the plurality of gripping parts and adjust a position of each of the plurality of gripping parts gripping the first member; a storage unit configured to store an original shape of the first member; and a control unit configured to drive the drive part and adjust positions of the plurality of gripping parts gripping the first member on the basis of the original shape stored in the storage unit such that a shape of the first member gripped by the plurality of gripping parts matches the original shape.

With this configuration, the gripping parts grip the long first member, and the drive part moves each of the gripping parts gripping the first member and adjusts the position of each of the gripping part. At this time, the control unit drives the drive part to adjust the positions of the gripping parts on the basis of the original shape of the first member stored in the storage unit. In this way, the first member gripped by the gripping parts is held in a shape matching the original shape of the first member stored in the storage unit by adjusting the positions of the gripping parts.

In the first aspect, the assembly body manufacturing device may further include a fixing part configured to fix a first end portion of the first member and restrain movement of the first member in a longitudinal direction.

With this configuration, the fixing part fixes the first end portion of the first member and restrains movement of the first member in the longitudinal direction, so that the first end portion of the first member can be set as a reference position for positioning.

In the first aspect, the fixing part may be disposed on either side of the gripping parts arranged in a row.

With this configuration, any of the fixing parts disposed on either side of the gripping parts arranged in a row can be used, so that the fixing part can be selected depending on the shape and the like of the first member when the fixing part fixes the first end portion of the first member.

In the first aspect, the assembly body manufacturing device may further include a mounting robot configured to mount a second member on the first member.

With this configuration, the mounting robot mounts the second member on the first member gripped by the gripping parts.

In the first aspect, at least one of the gripping parts and the mounting robot may be movable and relatively change a position thereof.

With this configuration, at least one of the gripping parts and the mounting robot moves to change a relative position thereof, so that the place where the mounting robot performs mounting can be different from, for example, the place where the gripping parts take out the first member from a supplying position.

In the first aspect, the assembly body manufacturing device may further includes: a movable table on which the gripping parts and the fixing part are placed; and a mounting robot configured to mount the second member on the first member, and the table may move to a vicinity of the mounting robot with the fixing part restraining movement of the first member in the longitudinal direction, with the positions of the plurality of gripping parts adjusted, and with the plurality of gripping parts gripping the first member.

With this configuration, the gripping parts and the fixing part are placed on the table, and the table moves to move the gripping parts and the fixing part. The mounting robot mounts the second member on the first member gripped by the gripping parts. When the table moves to the vicinity of the mounting robot, the fixing part fixes the first end portion of the first member and restrains movement of the first member in the longitudinal direction. Thus, the first end portion of the first member is set as a reference position for positioning. Furthermore, the first member gripped by the gripping parts is held in a shape matching the original shape of the first member stored in the storage unit by adjusting the positions of the gripping parts.

In the first aspect, the control unit may acquire position coordinates specifying the positions of the plurality of gripping parts and adjust the positions of the plurality of gripping parts on the basis of the position coordinates that are acquired such that the shape of the first member matches the original shape.

With this configuration, the positions of the gripping parts are adjusted on the basis of the position coordinates acquired by the control unit such that the shape of the first member matches the original shape. Thus, the positions of the gripping parts are adjusted precisely.

In the first aspect, gripping positions of the plurality of gripping parts are preliminarily determined on the basis of the original shape of the first member and an amount of deformation of the first member when the plurality of gripping parts grip the first member.

With this configuration, the positions where the gripping parts grip the first member are preliminarily determined on the basis of the original shape of the first member and the amount of deformation of the first member when the gripping parts grip the first member, so that the gripping parts can grip the first member in such positions that the amount of deformation of the first member is minimized, for example.

In the first aspect, a reference point used for adjusting the positions of the plurality of gripping parts may be determined on the basis of positional information derived from an installation position of the fixing part.

With this configuration, the reference point used for adjusting the positions of the gripping parts is determined precisely, so that the position of the first member can be adjusted precisely.

In the first aspect, a reference coordinate used for adjusting the positions of the plurality of gripping parts may be determined on the basis of positional information derived from installation positions of two of the fixing parts.

With this configuration, the reference coordinate used for adjusting the positions of the gripping parts is determined precisely, so that the position of the first member can be adjusted precisely.

An assembly body manufacturing method according to a second aspect of the present invention includes the steps of: gripping a first member having a long shape with a plurality of gripping parts; moving the plurality of gripping parts with a drive part to adjust positions of the plurality of gripping parts gripping the first member, driving the drive part with a control unit to adjust the positions of the plurality of gripping parts on the basis of an original shape of the first member stored in a storage unit such that a shape of the first member gripped by the gripping parts matches the original shape; and mounting a second member on the first member.

In the second aspect, the assembly body manufacturing method may further includes the steps of: fixing a first end portion of the first member to a fixing part and restraining movement of the first end portion of the first member in a longitudinal direction; moving a table on which the plurality of gripping parts and the fixing part are placed to a vicinity of a mounting robot with the fixing part restraining the first end portion of the first member, with the positions of the plurality of gripping parts adjusted, and with the plurality of gripping parts gripping the first member; and mounting the second member on the first member with the mounting robot.

Advantageous Effects of Invention

According to the present invention, the long member can be held in the original shape of the long member at a precise position without using a fixing jig in holding the long member.

DESCRIPTION OF EMBODIMENTS

A long member assembling device according to embodiments of the present invention will be described below with reference to the drawings.

A configuration of the long member assembling device 1 according to the present embodiment will now be described with reference to FIG. 1.

The long member assembling device 1 includes a conveyor 2, a table 3, a plurality of supporting robots (gripping robots) 4, touch plates 5, mounting robots 6, and a laser tracker 7. The long member assembling device 1 is an assembly body manufacturing device that manufactures an assembly body, the long member assembling device 1 having a configuration in which another component 22, which is a second member, is mounted on a long member 10, which is a first member.

The long member assembling device 1 takes out the long member 10 from a supplying position 20 and conveys the long member 10 to a mounting position 21. Then, the other component 22 is mounted on the long member 10 in the mounting position 21. Before the component 22 is mounted, the long member 10 is temporarily placed in the supplying position 20, and the mounting robots 6 are placed in the vicinity of the mounting position 21 fixed on the floor.

The long member 10 is, for example, a stringer which is a structural member of an aircraft. The stringer has a length of approximately 5 m to 15 m and has a stereoscopic shape with a compound curve, for example. Another component 22 called clip, for example, is mounted on the stringer. Herein, an object having a configuration in which the clip is mounted on the stringer corresponds to the assembly body. The clip is a component used in forming a long frame to which a plurality of the stringers are connected. When the frame is assembled together with the stringers, the clips mounted in precise positions in the longitudinal direction of the stringers enable the frame to be formed with the stringers connected thereto while the frame does not bend.

A generally used conveyor can be used as the conveyor 2. The table 3, which will be described after, is placed on the conveyor 2. The conveyor 2 moves the table 3 from a first end portion side to a second end portion side and from the second end portion side to the first end portion side. The first end portion side of the conveyor 2 is located in the vicinity of the supplying position 20 for the long member 10, and the conveyor 2 moves the table 3 from the vicinity of the supplying position 20 to the vicinity of the mounting robots 6.

When a plurality of the components 22 are mounted on the long member 10 in the longitudinal direction, one of the components 22 is mounted in a predetermined region of the long member 10, and then the conveyor 2 conveys the table 3 on which the supporting robots 4 gripping the long member 10 are installed. This operation allows the long member 10 to be conveyed while the supporting robots 4 grip the long member 10 while maintaining a component shape of the long member 10 in a predetermined held shape, and allows a component 22 to be mounted in a next predetermined region. After the other component 22 is mounted in the predetermined region, the conveyor 2 conveys the table 3, and a component 22 is mounted in a further next predetermined region of the long member 10. This operation is repeated to mount the components 22 on the entirety of the long member 10 in the longitudinal direction. A single component 22 may be mounted in a predetermined region, or a plurality of the components 22 may be mounted in the longitudinal direction of the predetermined region.

The supporting robots 4 and the touch plates 5 are installed in a row on the table 3. This configuration enables the supporting robots 4 and the touch plates 5 to integrally move on the conveyor 2. The supporting robots 4 are placed in a row on the table 3. The touch plates 5 are placed on both ends of the table 3, that is, both sides of the supporting robots 4. The number of the supporting robots 4 placed on the table 3 and the distance between the supporting robots 4 are preliminarily determined depending on the long member 10 to be assembled. The number of the supporting robots 4 to be operated for gripping the long member 10 is determined on the basis of the length of the long member 10 to be actually gripped. The drawing illustrates a state in which four out of five supporting robots 4 are gripping the long member 10.

Figure 1:
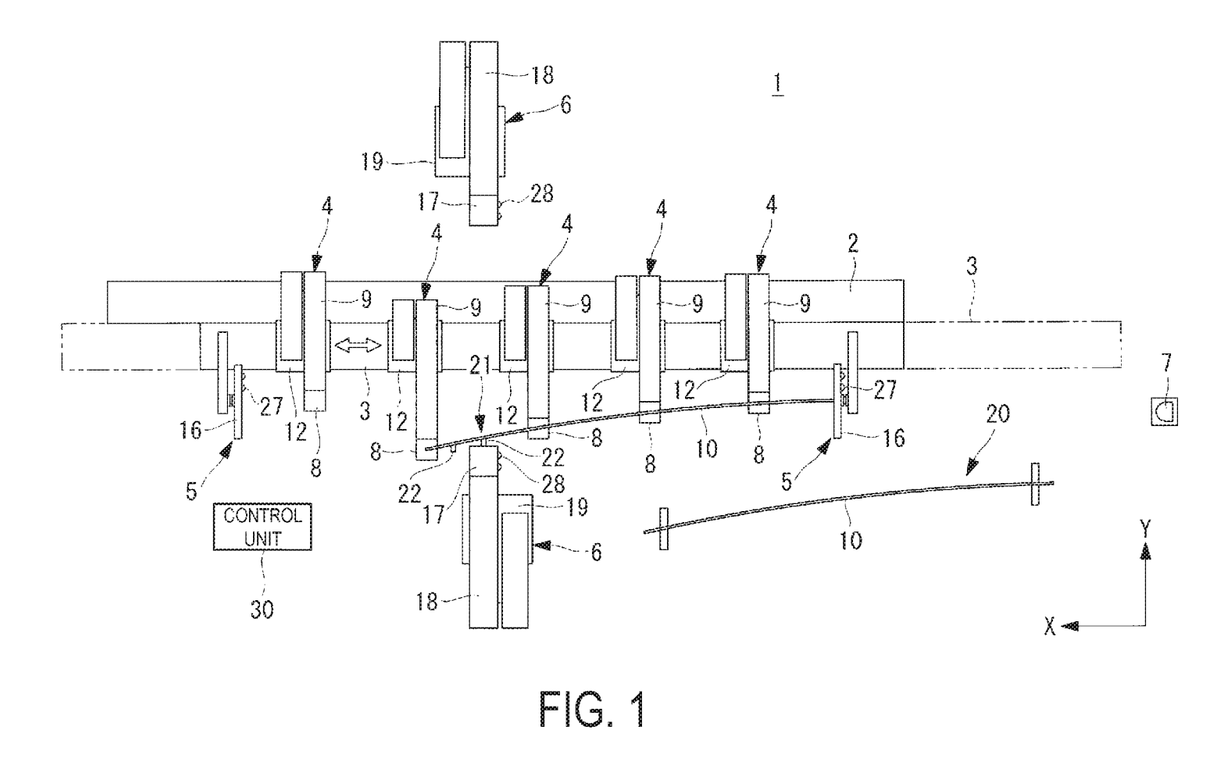
FIG. 1 is a plan view illustrating a long member assembling device according to an embodiment of the present invention.
Figure 2:
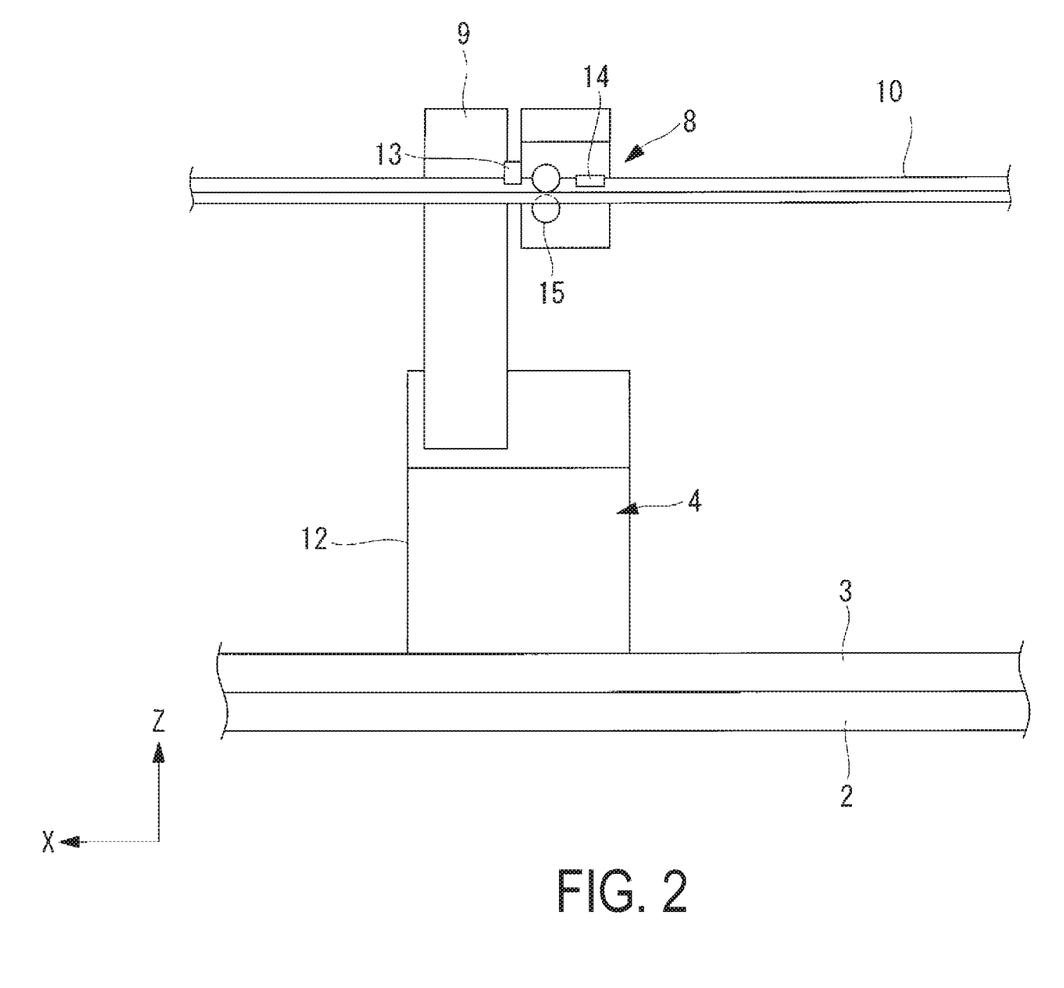
FIG. 2 is a front view illustrating a gripping robot of the long member assembling device according to the embodiment of the present invention.

As illustrated in FIGS. 1 and 2, the supporting robots 4 each include a hand part 8 that grips the long member 10, an arm part 9 provided with the hand part 8 at the leading end thereof, and a trunk part 12 supporting the arm part 9. The hand part 8 is exemplified as a gripping part, and the arm part 9 and the trunk part 12 are exemplified as a drive part.

The hand part 8 includes a stopper 13 that grips the long member 10 to prevent the long member 10 from falling off, an A reference plane roller part 14 that determines a Y coordinate of the long member 10 so that the hand part 8 can move the long member 10 in an X direction when the stopper 13 does not grip the long member 10, and a B reference plane roller part 15 that determines a Z coordinate. A detailed configuration of the hand part 8 will be described below.

The arm part 9 and the trunk part 12 move the hand part 8 so that the hand part 8 can appropriately grip the long member 10. A generally used configuration of robots can be applied to the arm part 9 and the trunk part 12. The supporting robot 4 detects the position of the hand part 8 and moves the hand part 8 on the basis of a reference position the supporting robot 4 itself has.

The touch plates 5 each include a flat plate part 16, and a first end portion of the long member 10 comes into contact with a surface of the flat plate part 16.

The touch plate 5 restrains the first end portion of the long member 10. This configuration allows a position of the first end portion of the long member 10 coming into contact with the touch plate 5 to be set as a reference position for positioning the other component 22 when the other component 22 is mounted. A detailed configuration of the touch plate 5 will be described below.

The touch plate 5 is provided with reflectors 27 that receive laser beams from the laser tracker 7. The laser tracker 7 detects positional information on the reflectors 27 disposed on the touch plate 5 on the basis of the laser beams radiated from the laser tracker 7 and reflected by the reflectors 27. The positional information on the reflectors 27 enables detection of the position and inclination of the touch plate 5 and determination of a reference coordinate.

One touch plate 5 is placed on either end of the table 3, that is, on each side of the plurality of supporting robots 4. Only one of the two touch plates 5 is used to bring the long member 10 into contact with the touch plate 5. The touch plate 5 is selected depending on the shape of the long member 10. FIG. 1 is a view illustrating a state in which the long member 10 is in contact with the touch plate 5 located closer to the laser tracker 7.

The mounting robots 6 each include a hand part 17 that mounts the other component 22 on the long member 10, an arm part 18 provided with the hand part 17 at the leading end thereof, and a trunk part 19 supporting the arm part 18.

The arm part 18 and the trunk part 19 move the hand part 17 so that the hand part 17 can mount the other component 22 on the long member 10. A generally used configuration of robots can be applied to the arm part 18 and the trunk part 19. The mounting robot 6 detects the position of the hand part 17 and moves the hand part 17 on the basis of a reference position the mounting robot 6 itself has and positional information on reflectors 28 disposed on the hand part 17 of the mounting robot 6.

The hand part 17 of the mounting robot 6 is provided with the reflectors 28 that receives laser beams from the laser tracker 7. The laser tracker 7 detects the positional information on the reflectors 28 disposed on the hand part 17 on the basis of the laser beams radiated from the laser tracker 7 and reflected by the reflectors 28. The hand part 17 can be controlled on the basis of the positional information on the reflectors 28 detected by the laser tracker 7, and the precision of positional control of the hand part 17 of the mounting robot 6 can be enhanced.

At least three reflectors 28 are installed on the hand part 17, and the position of each of the reflectors 28 is detected by the laser tracker 7. This configuration enables correct calculation of the position and inclination of the hand part 17.

FIG. 1 illustrates a case in which two mounting robots 6 are used. For example, one of the mounting robots 6 grips and fixes both the long member 10 and the component 22, and the other mounting robot 6 perforates and rivets the long member 10 and the component 22.

The laser tracker 7 scans the reflectors 27, 28 with the laser beams to detect the positions of the reflectors 27, 28. The laser tracker 7 is installed in a position separate from the conveyor 2, the supporting robots 4, and the mounting robots 6 in a fixed manner.

Figure 3:
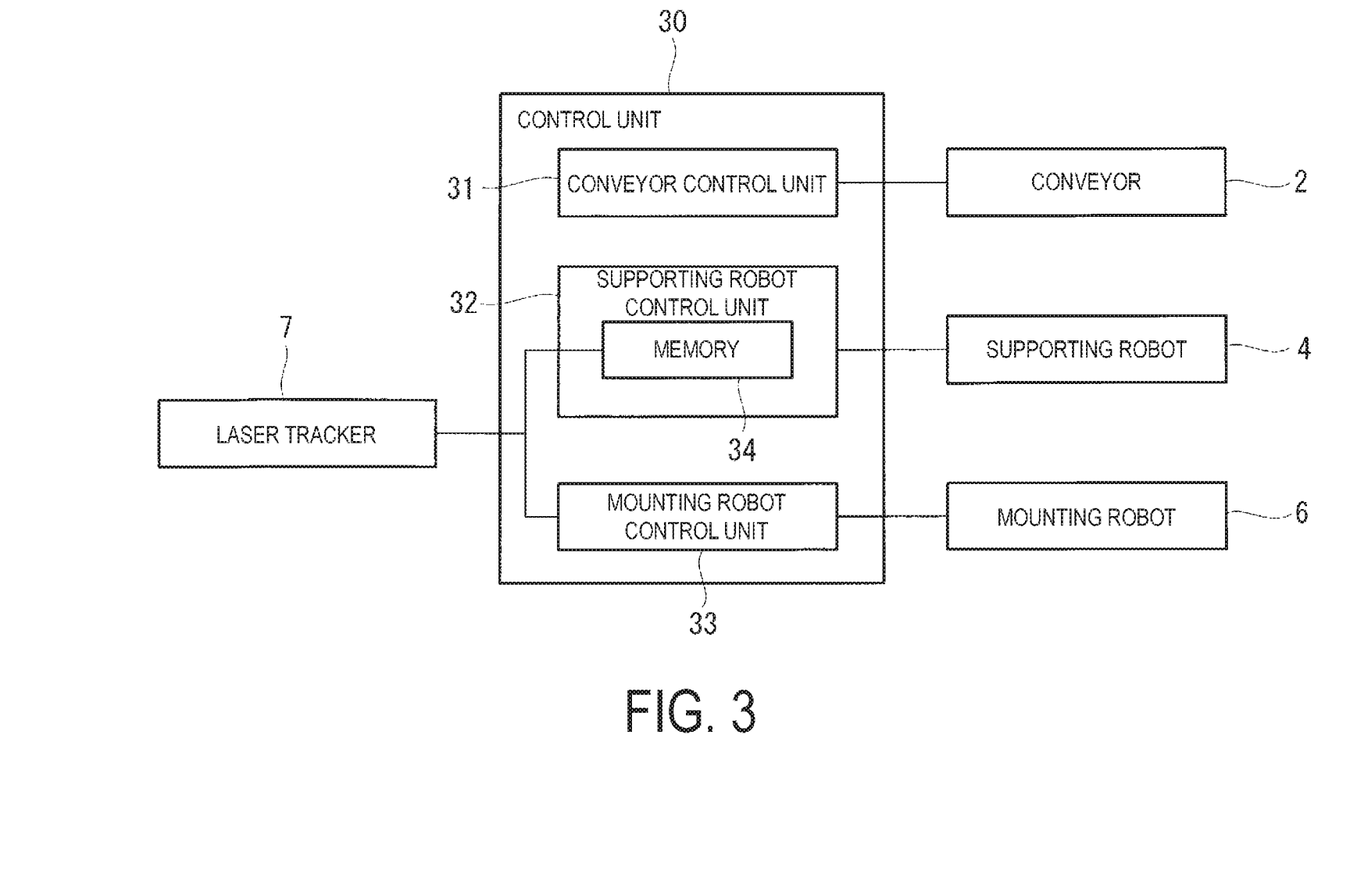
FIG. 3 is a block diagram illustrating a control unit of the long member assembling device according to the embodiment of the present invention.

As illustrated in FIG. 3, a control unit 30 that controls the long member assembling device 1 includes, for example, a conveyor control unit 31, a supporting robot control unit (gripping robot control unit) 32, and a mounting robot control unit 33. The control unit 30 is, for example, a computer executed with a program.

The conveyor control unit 31 adjusts the position of the conveyor 2 so that the predetermined region of the long member 10 moves to the mounting position 21. The conveyor control unit 31 actuates the conveyor 2 to move the table 3 to a predetermined position on the basis of the region of the long member 10 where the component 22 is mounted and the mounting position 21.

The supporting robot control unit (gripping robot control unit) 32 detects the position of the hand part 8 and causes the hand part 8 to move on the basis of the reference position the supporting robot 4 itself has and the reference coordinate determined with the positional information, detected by the laser tracker 7, on the reflectors 27 disposed on the touch plate 5. The supporting robot control unit 32 brings an end portion of the supporting robot 4 into contact with the touch plate 5. The supporting robot control unit 32 also causes the hand parts 8 of the supporting robots 4 to move corresponding to the original shape of the long member 10 stored in a memory 34.

The mounting robot control unit 33 detects the positions of the hand parts 17 and causes the hand parts 17 to move on the basis of the reference positions the mounting robots 6 have, the reference coordinate determined with the positional information, detected by the laser tracker 7, on the reflectors 27 disposed on the touch plate 5, and the positional information on the reflectors 28 disposed on the hand part 17. The mounting robot control unit 33 operates the hand parts 17 to mount the other component 22 on the long member 10. Specifically, the mounting robot control unit 33 causes the hand parts 17 to grip the long member 10 and the component 22 and to perforate and rivet the long member 10 and the component 22.

Figure 4:
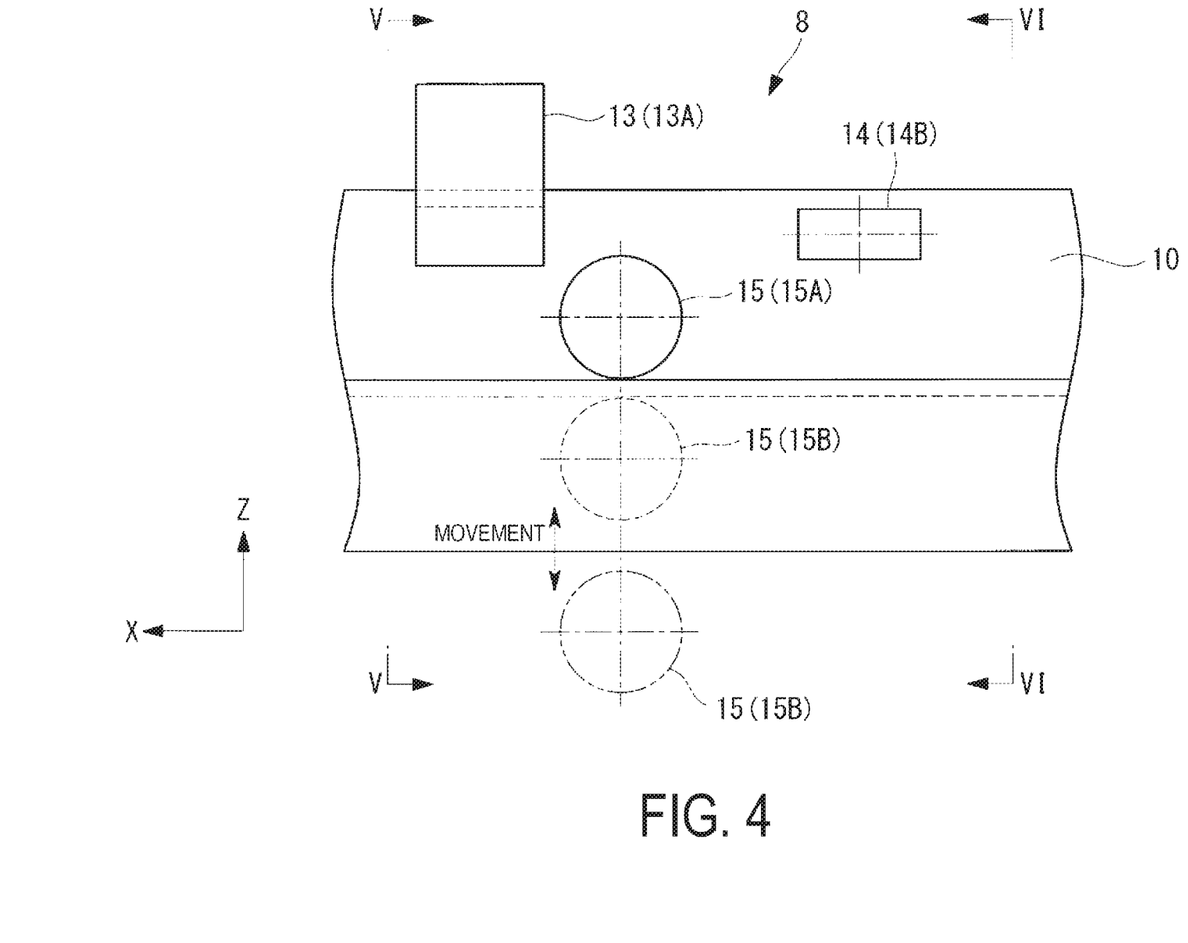
FIG. 4 is a front view illustrating a hand part of the gripping robot of the long member assembling device according to the embodiment of the present invention.
Figure 5:
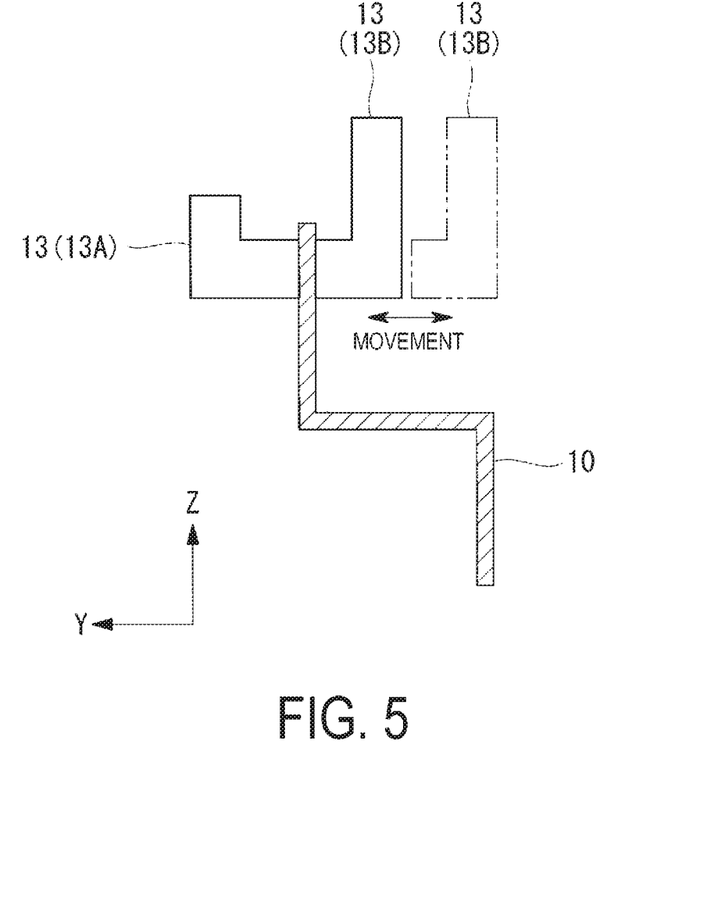
FIG. 5 is a cross-sectional view taken along line V-V in FIG. 4.
Figure 6:
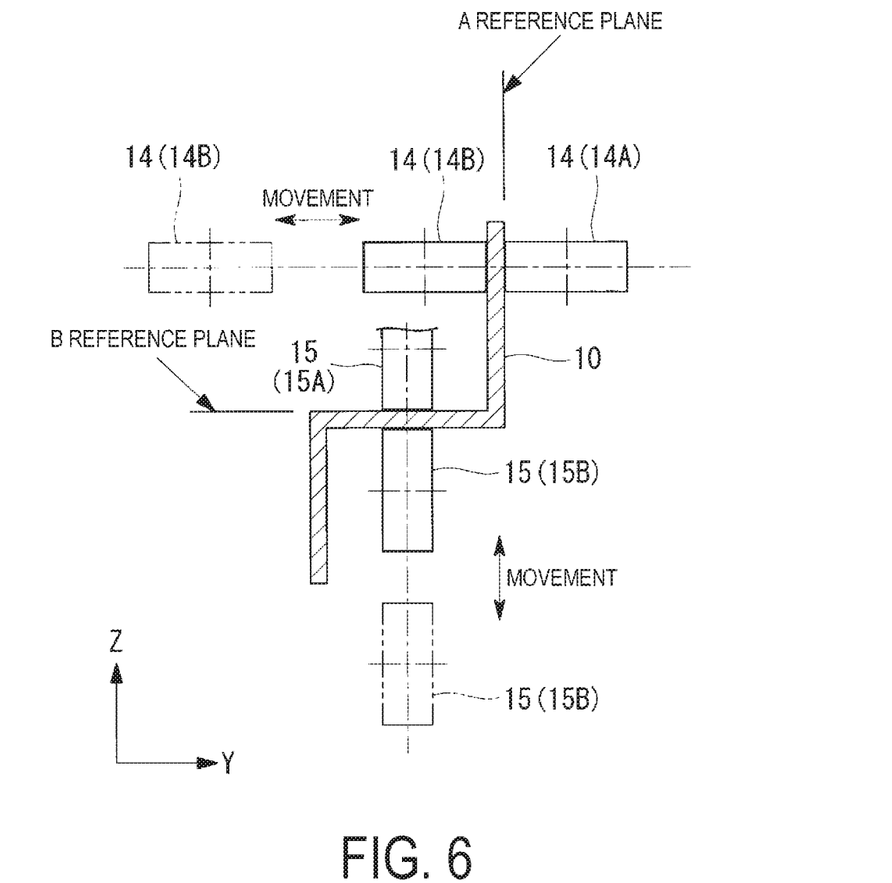
FIG. 6 is a cross-sectional view taken along line VI-VI in FIG. 4.

A configuration of the hand part 8 of the supporting robot 4 will now be described with reference to FIGS. 4 to 6.

The hand part 8 of the supporting robot 4 includes the stopper 13, the A reference plane roller part 14, and the B reference plane roller part 15. Note that FIGS. 4 to 6 illustrate a case in which the horizontal cross section of the long member 10 has a so-called Z shape; however, the present invention can also be applied to a long member 10 having a different cross-sectional shape by changing the stoppers 13 and the arrangement positions of the gripping parts.

The stopper 13 sandwiches a flat plate portion of the long member 10 from both sides. The stopper 13 is used in moving the long member 10 from the supplying position 20 to the conveyor 2 and prevents the long member 10 from falling off from the hand part 8 of the supporting robot 4. The long member 10 comes into contact with the touch plate 5 with the long member 10 being gripped using the stopper 13. At this time, only the stopper 13 of the supporting robot 4 located closest to the touch plate 5 is required to sandwich the long member 10. By bringing the long member 10 into contact using the supporting robot 4 closest to the touch plate 5, the amount of displacement caused during the contact can be reduced.

After the long member 10 comes into contact with the touch plate 5, the stopper 13 releases gripping of the long member 10.

The stopper 13 is composed of, for example, a fixed component 13A and a movable component 13B. The movable component 13B moves closer to and away from the fixed component 13A with an actuator (not illustrated). When the movable component 13B moves closer to the fixed component 13A, the flat plate portion of the long member 10 is sandwiched. In contrast, when the movable component 13B moves away from the fixed component 13A, sandwiching is released.

The A reference plane roller part 14 positions an A reference plane on the long member 10. The A reference plane roller part 14 adjusts the position of the Y coordinate of the gripped portion.

The A reference plane roller part 14 is composed of a fixed roller 14A and a movable roller 14B. The movable roller 14B moves parallel to the Y axis in the XY plane and moves closer to and away from the fixed roller 14A with an actuator (not illustrated). When the movable roller 14B moves closer to the fixed roller 14A, the flat plate portion of the long member 10 is sandwiched. In contrast, when the movable roller 14B moves away from the fixed roller 14A, sandwiching is released.

The rotation axes of the fixed roller 14A and the movable roller 14B extend perpendicular to the longitudinal direction of the long member 10 and parallel to the A reference plane. This configuration prevents the A reference plane roller part 14 from restraining movement of the long member 10 in the longitudinal direction and allows the long member 10 to move in the longitudinal direction when the fixed roller 14A and the movable roller 14B sandwich the long member 10.

A flat plate surface of the long member 10 coming into contact with the outer peripheral surface of the fixed roller 14A when the fixed roller 14A and the movable roller 14B sandwich the long member 10 is the A reference plane. Thus, by adjusting the position of the outer peripheral surface of the fixed roller 14A coming into contact with the A reference plane using the supporting robot 4, the A reference plane is positioned on the long member 10.

The B reference plane roller part 15 positions a B reference plane on the long member 10. The B reference plane roller part 15 adjusts the position of the Z coordinate of the gripped portion.

Similar to the A reference plane roller part 14, the B reference plane roller part 15 is composed of a fixed roller 15A and a movable roller 15B. The movable roller 15B moves parallel to the Z axis in the XZ plane with an actuator (not illustrated). The rotation axes of the fixed roller 15A and the movable roller 15B extend perpendicular to the longitudinal direction of the long member 10 and parallel to the B reference plane.

A flat plate surface of the long member 10 coming into contact with the outer peripheral surface of the fixed roller 15A when the fixed roller 15A and the movable roller 15B sandwich the long member 10 is the B reference plane. Thus, by adjusting the position of the outer peripheral surface of the fixed roller 15A coming into contact with the B reference plane using the supporting robot 4, the B reference plane is positioned on the long member 10.

Figure 7:
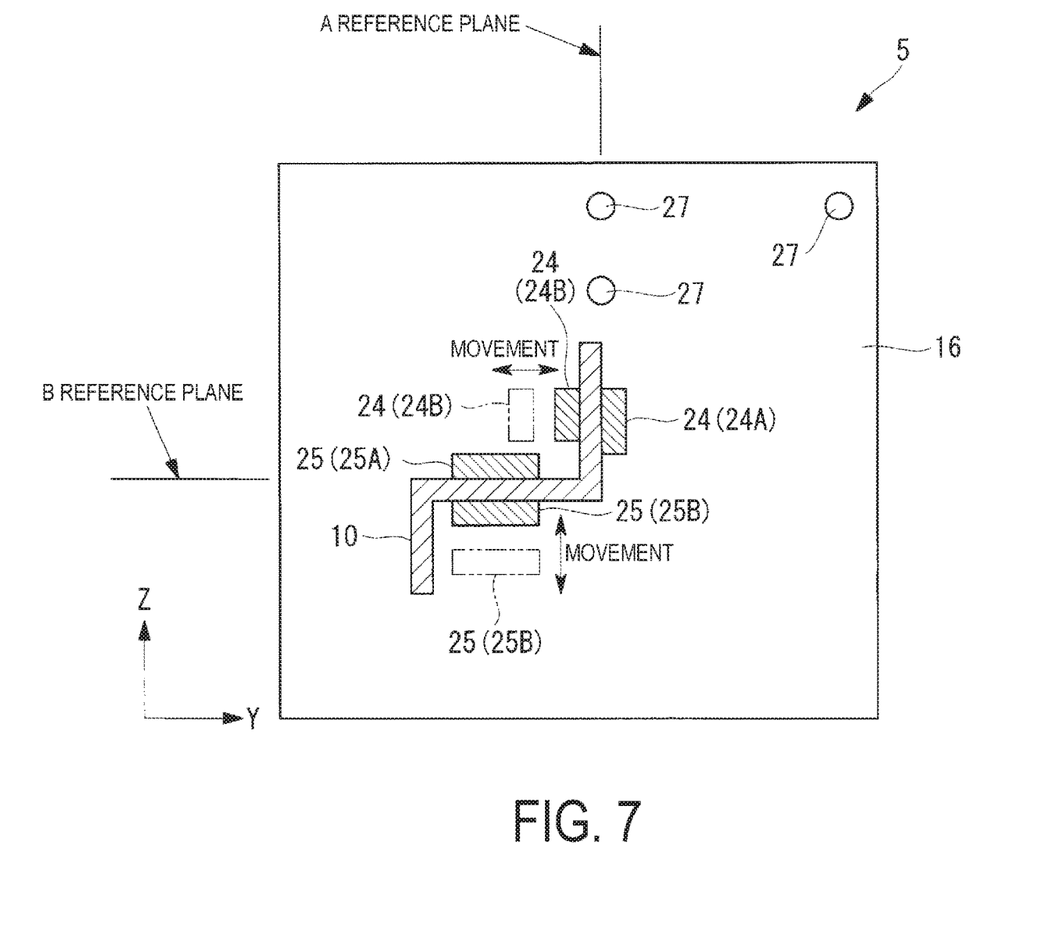
FIG. 7 is a cross-sectional view taken along line VII-VII in FIG. 8.
Figure 8:
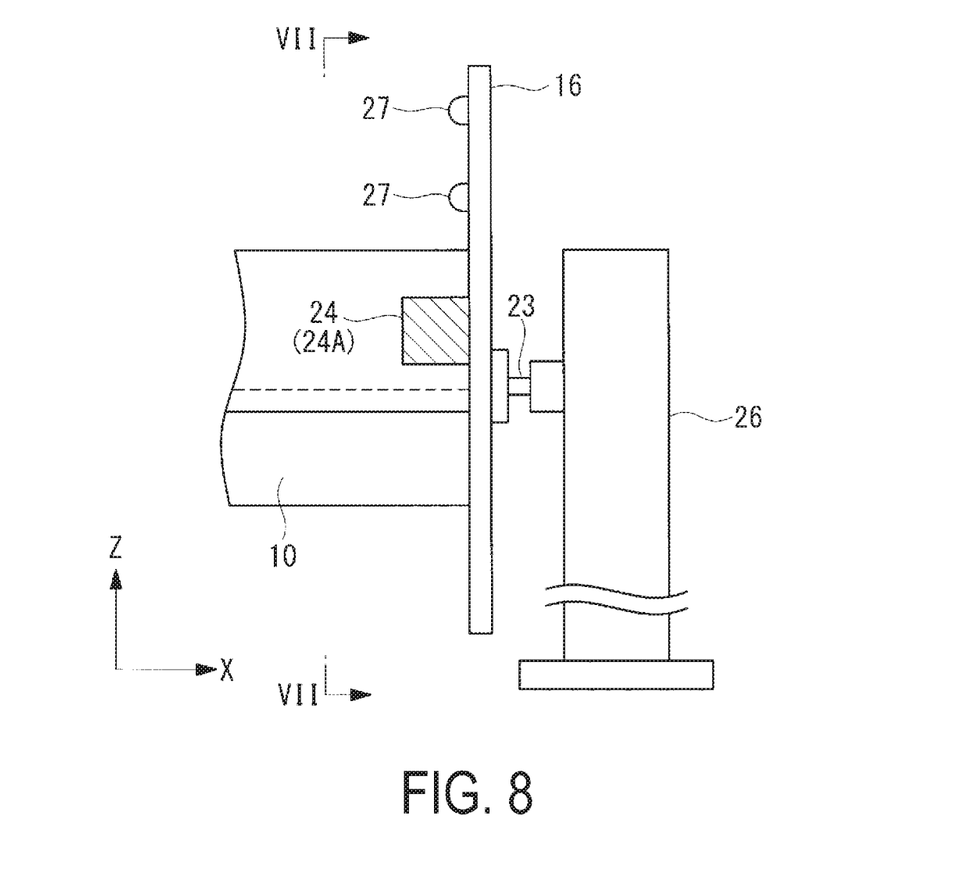
FIG. 8 is a front view illustrating a touch plate of the long member assembling device according to the embodiment of the present invention.

A configuration of the touch plate 5 will now be described with reference to FIGS. 7 and 8.

When the end surface (YZ surface) of the first end portion of the long member 10 completely comes into surface contact with a flat surface (YZ surface) of the flat plate part 16 of the touch plate 5 and is restrained in the Y direction and the Z direction, the position of the first end portion of the long member 10 coming into contact with the touch plate 5 and the extending direction of the long member 10 can be identified.

The touch plate 5 is provided with the flat plate part 16, an A reference plane jig 24 and a B reference plane jig 25 disposed on the flat plate part 16, a floating unit 23, and the reflectors 27. Note that FIGS. 7 and 8 illustrate a case in which the horizontal cross section of the long member 10 has a so-called Z shape; however, the present invention can also be applied to a long member 10 having a different cross-sectional shape by changing the arrangement position of the A reference plane jig 24 and the B reference plane jig 25. FIG. 8 illustrates a state in which the long member 10 comes into contact with the touch plate 5 disposed on a side different from that in FIG. 1.

The A reference plane jig 24 restrains the long member 10 such that the A reference plane on the long member 10 is in a reference position. The A reference plane jig 24 restrains movement of the long member 10 in the Y direction.

The A reference plane jig 24 is composed of, for example, a fixed component 24A and a movable component 24B. The fixed component 24A is installed protruding on one surface side of the flat plate part 16. The movable component 24B moves closer to and away from the fixed component 24A with an actuator (not illustrated). When the movable component 24B moves closer to the fixed component 24A, the flat plate portion of the long member 10 is sandwiched. By contrast, when the movable component 24B moves away from the fixed component 24A, sandwiching is released.

The surface of the fixed component 24A that comes into contact with the long member 10 is perpendicular to the flat surface of the flat plate part 16. This configuration ensures that the end surface of the long member 10 is pressed against the touch plate 5 and enables correct setting of the extending direction of the long member 10 when the A reference plane jig 24 restrains movement of the long member 10 in the Y direction.

The flat plate surface of the long member 10 that comes into contact with the fixed component 24A when the fixed component 24A and the movable component 24B sandwich the long member 10 is the A reference plane.

The B reference plane jig 25 restrains the long member 10 such that the B reference plane on the long member 10 is in a reference position. The B reference plane jig 25 restrains movement of the long member 10 in the Z direction.

The B reference plane jig 25 is composed of, for example, a fixed component 25A and a movable component 25B. The surface of the fixed component 25A that comes into contact with the long member 10 is perpendicular to the flat surface of the flat plate part 16. This configuration ensures that the end surface of the long member 10 is pressed against the touch plate 5 and enables correct setting of the extending direction of the long member 10 when the B reference plane jig 25 restrains movement of the long member 10 in the Z direction.

The flat plate surface of the long member 10 that comes into contact with the fixed component 25A when the fixed component 25A and the movable component 25B sandwich the long member 10 is the B reference plane.

The floating unit 23 is installed between a support 26 and the flat plate part 16. The floating unit 23 allows the flat plate part 16 to move in the X direction and incline with respect to the X direction. This configuration enables the end surface of the long member 10 to appropriately come into surface contact with the surface of the flat plate part 16 of the touch plate 5.

The support 26 is installed in a fixed manner on the table 3.

At least three reflectors 27 are installed on the flat plate part 16, and the position of each of the reflectors 27 is detected by the laser tracker 7. This configuration enables correct calculation of the position and inclination of the flat plate part 16.

Figure 9:
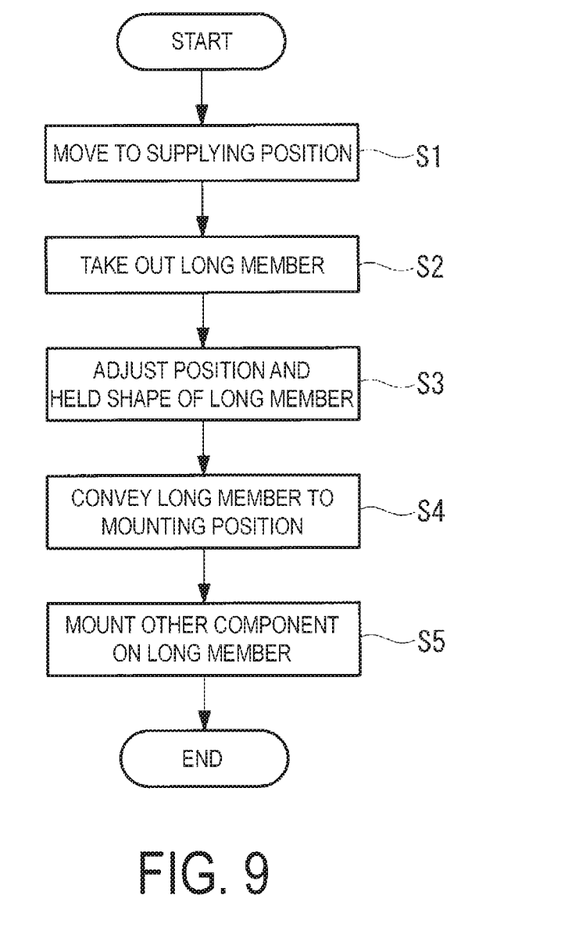
FIG. 9 is a flowchart illustrating operations of the long member assembling device according to the embodiment of the present invention.

Operations of the long member assembling device 1 according to the present embodiment will now be described with reference to the flowchart illustrated in FIG. 9.

Before the other component 22 is mounted on the long member 10, the long member 10 to be assembled is temporarily placed on a rack or the like in the supplying position 20. The table 3 on which the supporting robots 4 are placed moves on the conveyor 2 so that the supporting robots 4 approach the long member 10 temporarily placed in the supplying position 20 (step S1). At this time, the number of the supporting robots 4 for gripping the long member 10 and the touch plate 5 with which the long member 10 comes into contact have been determined. Note that the positions of the supporting robots 4 on the table 3 have been already adjusted.

Next, the hand parts 8 of the supporting robots 4 grip the long member 10 and move the long member 10 from the supplying position 20 to the conveyor 2 to take out the long member 10 from the supplying position 20 (step S2). At this time, the hand parts 8 of the supporting robots 4 preferably grip the long member 10 in such positions that the long member 10 does not bend, that is, in such positions that tensile force or compressive force is not applied to the long member 10.

Then, the supporting robots 4 adjust the position and held shape of the long member 10 (step S3). At this time, the first end portion of the long member 10 is restrained by the touch plate 5. This operation enables correct adjustment of the position and held shape of the long member 10 with reference to the first end portion of the long member 10.

After the position and the like of the long member 10 are adjusted, the conveyor 2 conveys the table 3 with the supporting robots 4 gripping the long member 10. This operation allows the supporting robots 4 on the table 3 placed on the conveyor 2 to be conveyed and the long member 10 to be moved to the mounting position 21 where the mounting robots 6 can mount the other component 22 on the long member 10 (step S4).

Then, the mounting robots 6 mount the other component 22 on the long member 10 (step S5). Since the supporting robots 4 have adjusted the position and held shape of the long member 10 correctly as described above, the mounting robots 6 can mount the other component 22 in a desired precise position. The supporting robots 4 may adjust the position and held shape of the long member 10 again before the mounting robots 6 mount the other component 22 on the long member 10.

After the supporting robots 4 adjust the position and the like of the long member 10 and the long member 10 is conveyed and before the mounting robots 6 mount the other component 22, it may be checked whether the long member 10 is held in the original shape or a precise position. For example, it is checked whether the long member 10 is held in the original shape by measuring the mounting position of the other component 22 on the long member 10 and measuring the total length of the long member 10.

Figure 10:
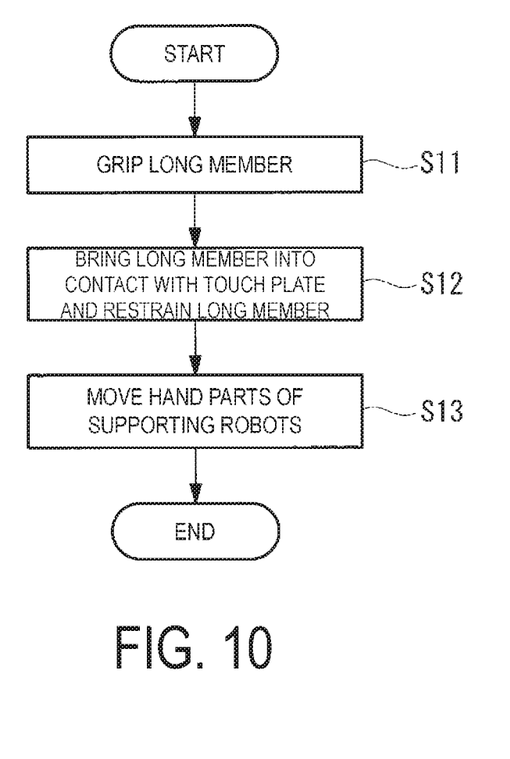
FIG. 10 is a flowchart illustrating operations of the gripping robots of the long member assembling device according to the embodiment of the present invention.

A method of gripping the long member 10 by the supporting robots 4 according to the present embodiment will now be described with reference to the flowchart illustrated in FIG. 10.

The supporting robots 4 grip the long member 10 in such positions that the amount of deformation (the amount of bend) of the long member 10 is minimized (step S11). The number of the supporting robots 4 for gripping the long member 10 is determined on the basis of the total length and shape of the long member 10, the operating range of the supporting robots 4, and the like. The gripping positions where the amount of deformation of the long member 10 is minimized are determined through preliminary analysis, for example. If the touch plate 5 is used to restrain an end portion of the long member 10, the restraint imposed by the touch plate 5 is also considered as an analysis condition.

Concerning the gripping positions of the supporting robots 4, it is estimated that, for example, one of the supporting robots 4 grips an end portion of the long member 10 and the supporting robots 4 grip the long member 10 at equal intervals. Precise gripping positions are calculated through analysis and adjusted minutely. Note that the mounting position of the other component 22 mounted on the long member 10 is also considered in the analysis, and thus the amount of deformation of the long member 10 is not always minimized in the gripping positions.

After the long member 10 is taken out from the supplying position 20 to the conveyor 2, the supporting robots 4 bring the end portion of the long member 10 into contact with the touch plate 5. Then, the touch plate 5 restrains the end portion of the long member 10 by a method described later (step S12). This operation restrains the end portion of the long member 10 from moving in all of the X direction, Y direction, and Z direction.

If the touch plate 5 is not used, the hand parts 8 of the supporting robots 4 produce errors, and it is difficult to completely prevent movement of the long member 10. Thus, it is difficult to completely restrain movement in all of the X, Y, and Z directions. Using the touch plate 5 can reduce errors and determine the reference position.

After the touch plate 5 restrains the end portion of the long member 10, each of the supporting robots 4 adjusts the gripping position again. At this time, the adjustment starts from the supporting robot 4 located closest to the touch plate 5, thereby minimizing errors in the position and shape of the long member 10.

The hand parts 8 of the supporting robots 4 move to positions where the shape of the long member 10 gripped by the supporting robots 4 matches the original shape, on the basis of the original shape of the long member 10 (step S13). The original shape is a shape of the long member 10 stored in the memory. The memory stores, for example, design dimensions of the long member 10 as the original shape. The destination positions of the hand parts 8 are positions in a coordinate with its reference (zero point) being the reference position, that is, the position where the long member 10 is restrained on the touch plate 5. The coordinates of the destination positions of the hand parts 8 are calculated on the basis of the original shape stored in the memory. When the hand parts 8 move on the basis of the X, Y, Z coordinates calculated as the destination positions, the long member 10 is held in such a position that its shape matches the original shape.

Note that even if the hand parts 8 of the supporting robots 4 stop movement with errors in positions, the hand parts 8 have such a configuration as not to restrain the long member 10 in the X direction, that is, in the longitudinal direction of the long member 10, as described above. Thus, tensile force or compressive force is not applied to the long member 10 in the longitudinal direction. Accordingly, the long member 10 is not likely to deform.

A method of bringing the long member 10 into contact with the touch plate 5 by the hand parts 8 of the supporting robots 4 and restraining the end portion of the long member 10 will now be described.

The supporting robots 4 use the hand parts 8 to grip predetermined positions of the long member 10 located in the supplying position 20. These gripping positions may not be as precise as those when the other component 22 is mounted, and are based on positions detected by position detection units of the supporting robots 4 and the conveyor 2.

With the stoppers 13 gripping the long member 10, the supporting robots 4 bring the long member 10 into contact with the touch plate 5. At this time, the floating unit 23 completely brings the end surface (YZ surface) of the first end portion of the long member 10 into surface contact with the flat surface (YZ surface) of the touch plate 5.

Then, the A reference plane jig 24 and the B reference plane jig 25 of the touch plate 5 sandwich the long member 10 in the order of the A reference plane jig 24 and the B reference plane jig 25. This operation imposes such restraint that the A reference plane and the B reference plane on the long member 10 are in the reference positions. Then, the stoppers 13 of the supporting robots 4 release gripping of the long member 10. The long member 10 may be sandwiched in the order of the B reference plane jig 25 and the A reference plane jig 24, which is the inverse order of the above-described example.

A method of determining the reference coordinate of the long member assembling device 1 according to the present embodiment will now be described.

The reference coordinate is determined by, for example, detecting the reflectors 27 on the two touch plates 5 and using the positions of the detected reflectors 27 as references. Specifically, one of the reflectors 27 on the touch plate 5 disposed on the first end portion side of the table 3 is detected, and two of the reflectors 27 on the touch plate 5 disposed on the second end portion side of the table 3 are detected. This operation determines the XY plane and sets the reference coordinate.

The reference point (origin) on the touch plate 5 is determined by, for example, detecting the reflectors 27 on the touch plate 5 to be used for the origin and using the positions of the detected reflectors 27 as references.

Specifically, the origin is determined by detecting the three reflectors 27 on the touch plate 5 that is disposed on the first end portion side of the long member 10 and with which the first end portion of the long member 10 comes into contact. Then, the position of the origin on the touch plate 5 in the reference coordinate and the inclination of the flat plate part 16 of the touch plate 5 are calculated from the detected three points.

When the end surface (YZ surface) of the first end portion of the long member 10 completely comes into surface contact with the flat surface (YZ surface) of the flat plate part 16 of the touch plate 5 and is restrained in the Y direction and the Z direction, the position (origin) of the first end portion of the long member 10 coming into contact with the touch plate 5 and the extending direction of the long member 10 can be correctly identified because the position and inclination of the touch plate 5 with respect to the YZ plane in the reference coordinate are calculated.

The hand parts 8 move to the calculated destination positions and the like under positional control of the supporting robots 4 itself in the above description; however, the present invention is not limited to this example. Permanent reflectors may also be disposed on the hand parts 8 of the supporting robots 4, and the positions of the hand parts 8 may be controlled on the basis of positional information detected by the laser tracker 7. This configuration can enhance precision in mounting the component 22.

The permanent reflectors may not be disposed on the hand parts 8, 17, and detection may not be performed by the laser tracker 7 at all times. An error inherent in the supporting robots 4 or the mounting robots 6 may be detected preliminarily by the laser tracker 7 and stored. The reflectors are detached in mounting, and the supporting robots 4 or the mounting robots 6 are mounted in consideration of the stored error. This can enhance precision in mounting the component 22.

The supporting robots 4 and the touch plates 5 are placed on the conveyor 2 in the above description; however, the present invention is not limited to this example. A configuration is possible in which the mounting robots 6 may be placed on the conveyor in a movable manner relative to the supporting robots 4 and the touch plates 5.

The supporting robots 4 are arranged at predetermined intervals on the table 3 and integrated with the table 3 in the above-described embodiment; however, the present invention is not limited to this example. For example, the supporting robots 4 may be installed in a self-propelled manner on the table 3 on the basis of the length and shape of the long member 10 to be gripped. In this case, positional information on the supporting robots 4 with respect to a reference position on the table 3 is also used to position the hand parts 8 of the supporting robots 4.

REFERENCE SIGNS LIST

1 Long member assembling device
2 Conveyor
3 Table
4 Supporting robot (Gripping robot)
5 Touch plate
6 Mounting robot
7 Laser tracker
8, 17 Hand part
9, 18 Arm part
10 Long member
12, 19 Trunk part
13 Stopper
13A Fixed component
13B Movable component
14 A reference plane roller part
14A Fixed roller
14B Movable roller
15 B reference plane roller part
15A Fixed roller
15B Movable roller
16 Flat plate part
20 Supplying position
21 Mounting position
22 Component
23 Floating unit
24 A reference plane jig
25 B reference plane jig
26 Support
27, 28 Reflector
30 Control unit
31 Conveyor control unit
32 Supporting robot control unit (Gripping robot control unit)
33 Mounting robot control unit

The invention claimed is:

1. An assembly body manufacturing device, comprising:
   a plurality of gripping parts configured to grip a first member having a long shape;
   a drive part configured to move each of the plurality of gripping parts and adjust a position of each of the plurality of gripping parts gripping the first member;
   a storage unit configured to store an original shape of the first member; and
   a control unit configured to drive the drive part and adjust positions of the plurality of gripping parts gripping the first member on the basis of the original shape stored in the storage unit such that a shape of the first member gripped by the plurality of gripping parts matches the original shape,
   wherein gripping positions of the plurality of gripping parts are preliminarily determined on the basis of the original shape of the first member, an amount of deformation of the first member when the plurality of gripping parts grip the first member, and a mounting position of a second member mounted on the first member so as to reduce the amount of deformation of the first member.

2. The assembly body manufacturing device according to claim 1, further comprising a fixing part configured to fix a first end portion of the first member and restrain movement of the first member in a longitudinal direction.

3. The assembly body manufacturing device according to claim 2, wherein the fixing part is disposed on either side of the plurality of gripping parts arranged in a row.

4. The assembly body manufacturing device according to claim 1, further comprising a mounting robot configured to mount the second member on the first member.

5. The assembly body manufacturing device according to claim 4, wherein at least one of the plurality of gripping parts and the mounting robot is movable and relatively changes a position thereof.

6. The assembly body manufacturing device according to claim 2, further comprising:
   a movable table on which the plurality of gripping parts and the fixing part are placed; and
   a mounting robot configured to mount the second member on the first member, wherein
   the table moves to a vicinity of the mounting robot with the fixing part restraining movement of the first member in the longitudinal direction, with the positions of the plurality of gripping parts adjusted, and with the plurality of gripping parts gripping the first member.

7. The assembly body manufacturing device according to claim 1, wherein the control unit acquires position coordinates specifying the positions of the plurality of gripping parts and adjusts the positions of the plurality of gripping parts on the basis of the position coordinates that are acquired such that the shape of the first member matches the original shape.

8. The assembly body manufacturing device according to claim 2, wherein a reference point used for adjusting the positions of the plurality of gripping parts is determined on the basis of positional information derived from an installation position of the fixing part.

9. The assembly body manufacturing device according to claim 8, wherein a reference coordinate used for adjusting the positions of the plurality of gripping parts is determined on the basis of positional information derived from installation positions of the fixing part and an additional fixing part.

10. An assembly body manufacturing method using the assembly body manufacturing device of claim 1, comprising:
gripping the first member having a long shape with the plurality of gripping parts;
moving the plurality of gripping parts with the drive part to adjust positions of the plurality of gripping parts gripping the first member;
driving the drive part to adjust the positions of the plurality of gripping parts with the control unit on the basis of the original shape of the first member stored in the storage unit such that a shape of the first member gripped by the plurality of gripping parts matches the original shape,
wherein gripping positions of the plurality of gripping parts are preliminarily determined on the basis of the original shape of the first member an amount of deformation of the first member when the plurality of gripping parts grip the first member, and a mounting position of the second member mounted on the first member so as to reduce the amount of deformation of the first member; and mounting the second member on the first member.

11. The assembly body manufacturing method according to claim 10, further comprising:
fixing a first end portion of the first member to a fixing part and restraining movement of the first end portion of the first member in a longitudinal direction;
moving a table on which the plurality of gripping parts and the fixing part are placed to a vicinity of a mounting robot with the fixing part restraining the first end portion of the first member, with the positions of the plurality of gripping parts adjusted, and with the plurality of gripping parts gripping the first member; and
mounting the second member on the first member with the mounting robot.

* * * * *